United States Patent [19]
Young

[11] Patent Number: 5,884,731
[45] Date of Patent: Mar. 23, 1999

[54] EXTENSIBLE SUNSHINE SHELTER APPARATUS FOR WINDOW AREA OF PASSENGER TRANSPORTATION

[76] Inventor: Hai Tee Young, 10313 Lower Azusa Rd., Temple City, Calif. 91780

[21] Appl. No.: 794,419

[22] Filed: Feb. 5, 1997

[51] Int. Cl.[6] .................................................. B60J 3/02
[52] U.S. Cl. ..................... 296/97.4; 296/97.8; 296/97.6
[58] Field of Search ................................ 296/97.1, 97.3, 296/97.4, 97.6, 97.8

[56] References Cited

U.S. PATENT DOCUMENTS

| | | | |
|---|---|---|---|
| 1,557,388 | 10/1925 | Tilden | 296/97.4 |
| 2,574,729 | 11/1951 | Coffman | 296/97.4 |
| 3,412,506 | 11/1968 | Shiota | 296/97.4 |
| 4,618,132 | 10/1986 | Kimura | 296/97.4 |

FOREIGN PATENT DOCUMENTS

| | | | |
|---|---|---|---|
| 261525 | 11/1987 | Japan | 296/97.4 |
| 382001 | 11/1964 | Switzerland | 296/97.4 |

Primary Examiner—Gary C. Hoge
Attorney, Agent, or Firm—David & Raymond; Raymond Y. Chan

[57] ABSTRACT

An extensible sunshine shelter apparatus for a window area of a passenger transportation includes a pair of extensible devices, a mounting device and a blinding device. Each of the extensible devices includes a first extension tube and at least a second extension tube coaxially connected end to end together in such manner that the pair of second extension tubes are capable of slidably inserting into the pair of first extension tubes respectively. Each of the first and second extension tubes has an air hole thereon and further includes a holding member which is firmly attached to a bottom end portion thereof. The mounting device is hingedly jointed with the pair of first extension tubes for spacedly mounting the pair of extensible devices in parallel manner to an upper position, adjacent to the window area, of the passenger transportation. The blinding device includes at least two thin and light slats, in which the two slats are rotatably mounted between the two pairs of holding members which are attached to the bottom end portions of the pair of first extension tubes and the pair of second extension tubes respectively. The slats are mounted on different planes, so that when the second pair of extension tubes are contracted within the pair of first extension tubes, the slats are overlapped together.

21 Claims, 10 Drawing Sheets

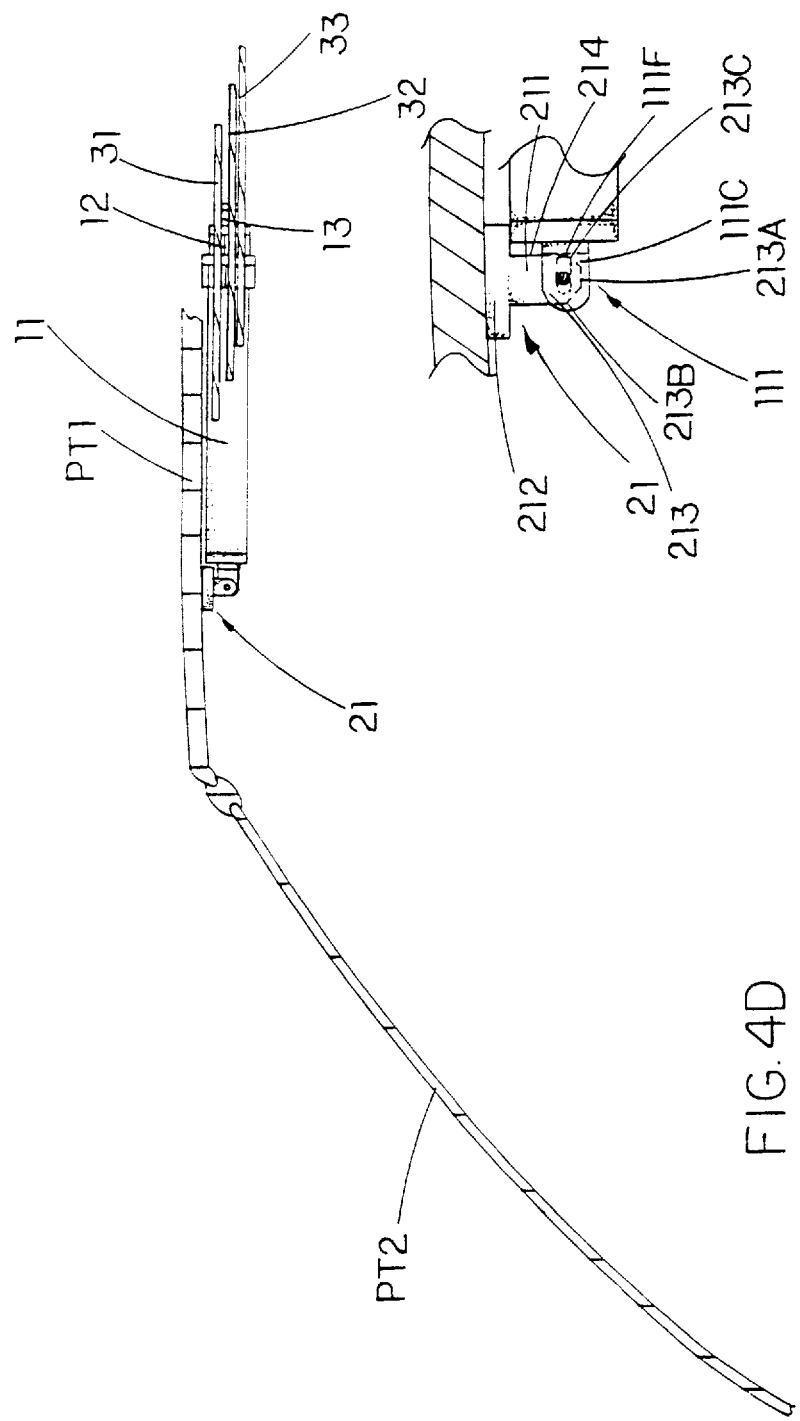

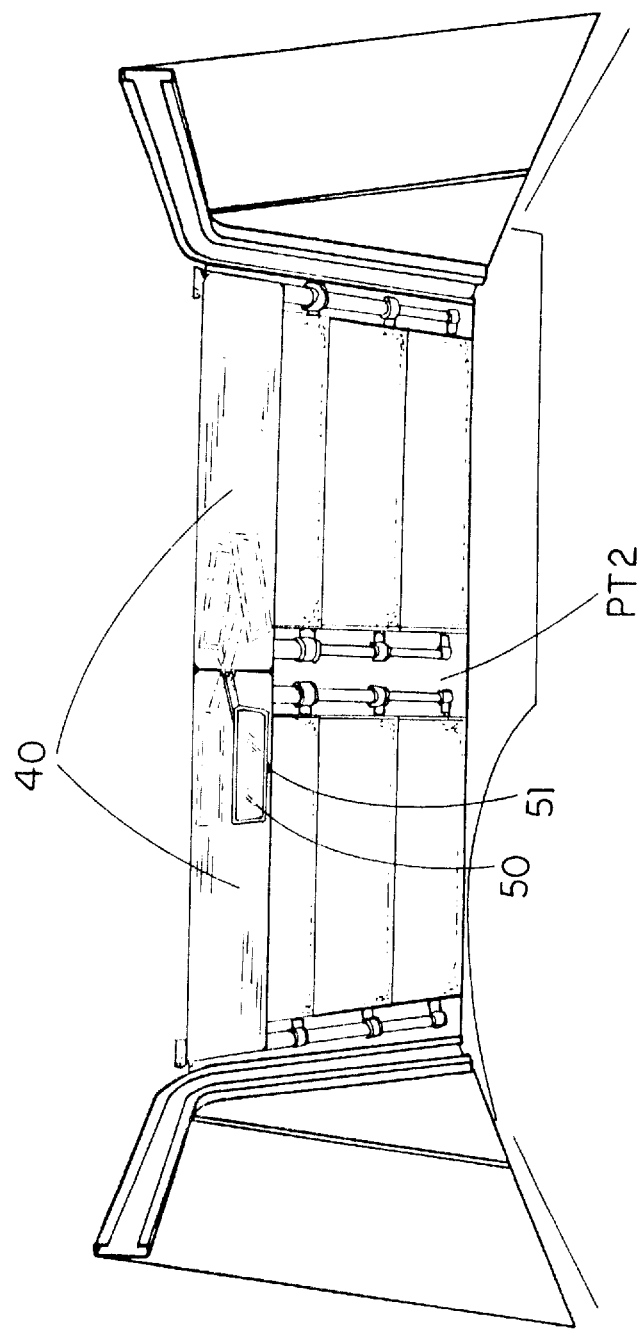

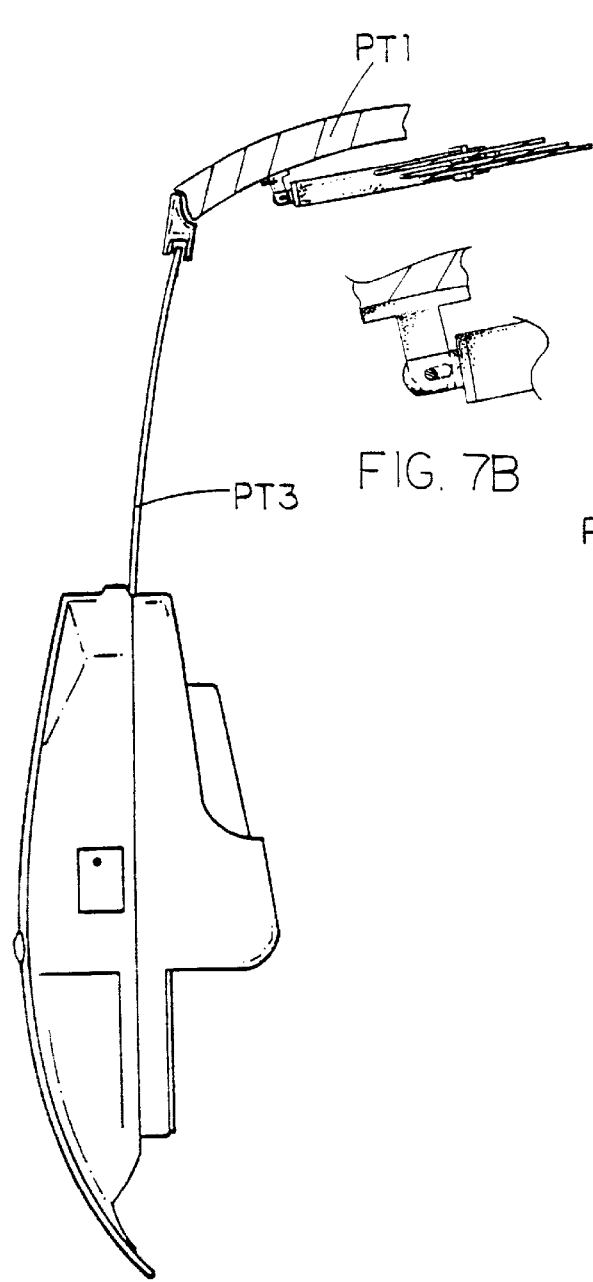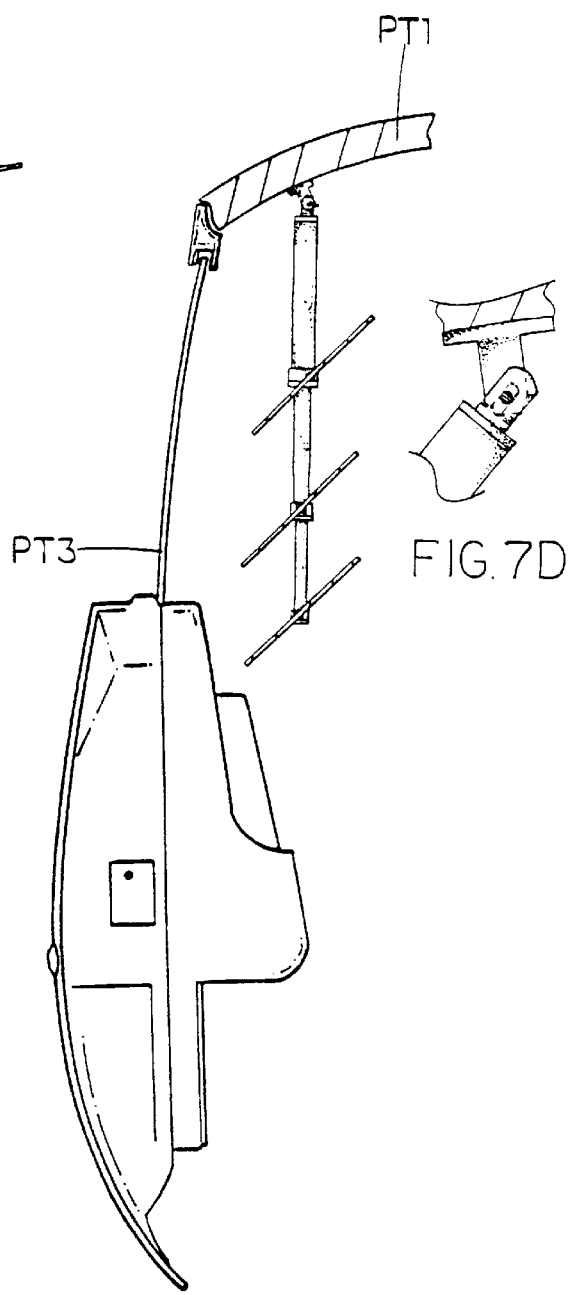
FIG. 7A  FIG. 7B  FIG. 7C  FIG. 7D

EXTENSIBLE SUNSHINE SHELTER APPARATUS FOR WINDOW AREA OF PASSENGER TRANSPORTATION

BACKGROUND OF THE PRESENT INVENTION

The present invention relates to sunshine shelter, and more particularly to an extensible sunshine shelter apparatus for window area of a passenger transportation such as vehicle, airplane, ship and ferry, etc. The extensible sunshine shelter apparatus of the present invention can prevent the radiation of sun shine from attacking the passengers without obstructing the passengers' field of vision. The basic inventive conception of the present invention is disclosed in the Inventive Disclosure Number 394322, 401502, 408865, and 410345 submitted by the applicant.

It is well known that overmuch exposure under sunshine does no good to human health, for example it hurts human skin and eyes and even causes skin cancer. However, the drivers or the passengers on those transportation such as trains, buses, ships, and airplanes are always inevitably disturbed or hurt by the radiation of sunshine. Most people complain about the radiation of sunshine because it does hurt to their skin and makes their skin aging and becoming rough and tanned with wrinkle.

Conventional method for reducing the shortcomings mentioned above is to tint all window glasses. However, it is illegal in most of the states in United States because the tinting may reduce the vision of the drivers and passengers, especially at night and cloudy weather. In mass transportation, such as airplanes, ships, trains, and buses, integral rigid curtains or cloth curtains are utilized to cover the entire window area for preventing the sunshine to disturb the passengers. But, in the meantime, the curtains would obstacle the whole field of vision of the passengers in the meantime.

When the vehicles are driven under sunshine, the strong sunshine may shine upon the drivers' faces and eyes that the drivers may be annoyed by those discomfort, uneasiness and inconvenience caused by the strong sunshine. It may affect the drivers' driving judgment and cause much hazard and unexpected danger during driving.

A pair of conventional shelter wings are mounted on an upper edge of a front windshield of a vehicle. The driver and the front passenger can swing the shelter wings toward the front windshield for shading the upper portion of the windshield to prevent the sunshine from shining directly upon the driver's and the front passenger's eyes. However, the shelter wings also obstacle portion of the windshield that reduces the field of vision of the driver that lessens the driving safety. Moreover, when the driver change the car's direction, he or she has to use one hand to re-adjust the position of the shelter wing from the front windshield to the side window. It may divert the driver's attention and cause accident. Besides, the faces, hands and the bodies of the driver and the front passenger are still exposed to the sunshine from most directions. The defectives cause by the sunshine to human skin are unavoidable.

Most drivers have such experience that when the vehicle park outdoor under the sunshine, the sun radiation may directly shine on the vehicles. The airtight interior of the vehicle will become hot an stuffy for re-entrance. Especially the steering wheel will be heated to become hand burning. The driver has to open the doors to enable air circulating for a while until the interior temperature decreases, and then starts the engine to run the air condition before the driver and the passengers get in the vehicle. It wastes much of time, so that to some impatient people, they may rush in the vehicle and drive. The extremely hot interior may affect the driving attention of the driver and the burning steering wheel is difficult to operate that may cause unexpected accident.

Two common devices are used currently to solve the aforesaid problems, which are a cardboard shelter and a twisted shelter for covering the entire front windshield of a vehicle. The cardboard shelter is made of hard cardboard paper and is foldable. The twisted shelter is made of nylon cloth with two circular springs mounted therein and is also foldable by twisting. Such conventional shelters are very troublesome that the driver has to unfold and extend it to cover the entire front windshield while parking. Before driving, the driver also has to refold and remove it from the front windshield. The folding and unfolding, as well as the installing and removing, operations are too troublesome and require much time since the interior space of a vehicle is too narrow for operating a shelter as large as the windshield. Moreover, we need to reserve some room for storing up the conventional extensible shelter when it is not used. The most essential shortcoming of such conventional extensible shelters is that since the space between the front windshield and the steering wheel and the back sight mirror is so narrow, every time when they are unfolded to cover or removed from the windshield, the back sight mirror may be bumped to move away from its original position. The driver has to reset the position of the back sight mirror before driving every time.

SUMMARY OF THE PRESENT INVENTION

It is a main object of the present invention to provide an extensible sunshine shelter apparatus for window area of passenger transportation, which can shade the sunshine from shining upon the faces and hands of driver and passengers without obstructing their vision.

It is another object of the present invention to provide an extensible sunshine shelter apparatus for window area of passenger transportation that the shading angle thereof can be adjusted according to the direction and angle of the sunshine.

It is still another object of the present invention to provide an extensible sunshine shelter apparatus for window area of passenger transportation, which can be adjusted to shelter the entire window area from sunshine while parking or desired by the passengers.

It is still another object of the present invention to provide an extensible sunshine shelter apparatus for window area of passenger transportation, which can be easily operated to unsheltered the entire window area.

It is yet another object of the present invention to provide an extensible sunshine shelter apparatus for window area of passenger transportation, which is easy to operate and install.

It is yet another object of the present invention to provide an extensible sunshine shelter apparatus for window area of passenger transportation, which can be adjusted to shelter only a top portion of the window area.

Accordingly, an extensible sunshine shelter apparatus for a window area of a passenger transportation of the present invention comprises a pair of extensible devices, a mounting device and a blinding device.

Each of the extensible devices comprises a first extension tube and at least a second extension tube coaxially connected end to end together. The first extension tube has an inner diameter larger than an outer diameter of the second extension tube, so that the pair of second extension tubes are capable of slidably inserting into the pair of first extension tubes respectively. A top end of each the first extension tube is firmly connected with a supporting head. A bottom end of each the first extension tube provides a first stopper to prevent the second extension tube from entirely stretching out from the first extension tube. Each the first extension tube has a first air hole thereon and further comprises a first holding member which is firmly attached to a bottom end portion of each the first extension tube. A top end of each the second extension tube is firmly connected with a first stopping head which has an enlarged stub having an outer diameter at least equal to the inner diameter of the first extension tube so as to provide friction between an inner surface of the respective first extension tube and the enlarged stub. A bottom end of each the second extension tube provides a second stopper to prevent each the second extension tube from entirely inserting into the respective first extension tube. Each the second extension tube has a second air hole thereon and further comprises a second holding member firmly attached to a bottom end portion of the second extension tube.

The mounting device is hingedly jointed with the pair of supporting heads of the pair of first extension tubes for spacedly mounting the pair of extensible devices in parallel manner to an upper position, adjacent to the window area, of the passenger transportation. The blinding device comprises at least two thin and light slats, in which the two slats are rotatably mounted between the two pairs of holding members which are attached to the bottom end portions of the pair of first extension tubes and the pair of second extension tubes respectively. The slats are mounted on different planes, so that when the second pair of extension tubes are contracted within the pair of first extension tubes, the slats are overlapped together.

BRIEF DESCRIPTION OF THE DRAWINGS

FIGS. 4A to 4E are end views illustrating the operation conditions of the extensible sunshine shelter apparatus according to the above preferred embodiment of the present invention, in which FIG. 4B is a partially enlarged sectional view of the mounting head and supporting head of FIGS. 4A and 4C, and FIG. 4E is a partially enlarged sectional view of the mounting head and supporting head of FIG. 4D.

FIG. 6 is a perspective view of a front windshield of a vehicle, having installed with a pair of extensible sunshine shelter apparatus according to the above alternative mode of the preferred embodiment of the present invention.

FIGS. 7A to 7D are end views illustrating the application of the extensible sunshine shelter apparatus of the above preferred embodiment of the present invention to a side window of the vehicle, in which FIG. 7B is a partially enlarged sectional view of the mounting head and supporting head of FIG. 7A and FIG. 7D is a partially enlarged sectional view of the mounting head and supporting head of FIG. 7C.

DETAILED DESCRIPTION OF THE PREFERRED EMBODIMENT

Referring to FIGS. 1 to 4, an extensible sunshine shelter apparatus for window area of passenger transportation of the present invention comprises a pair of extensible devices 10, a mounting device 20 and a blinding device 30.

Figure 2:
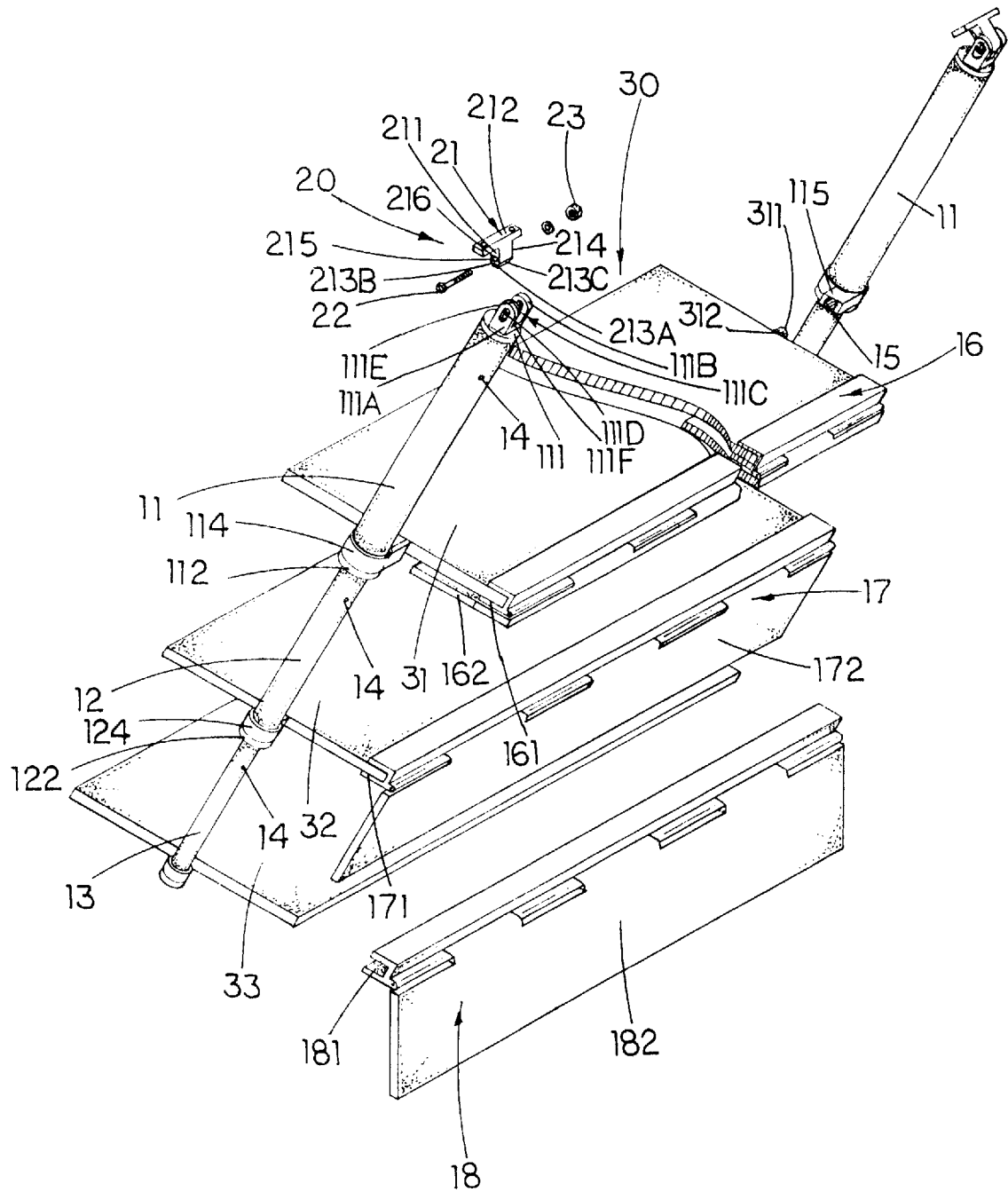
FIG. 2 is a partial exploded perspective view of an extensible sunshine shelter apparatus according to the above preferred embodiment of the present invention.
Figures 3A, 3B:
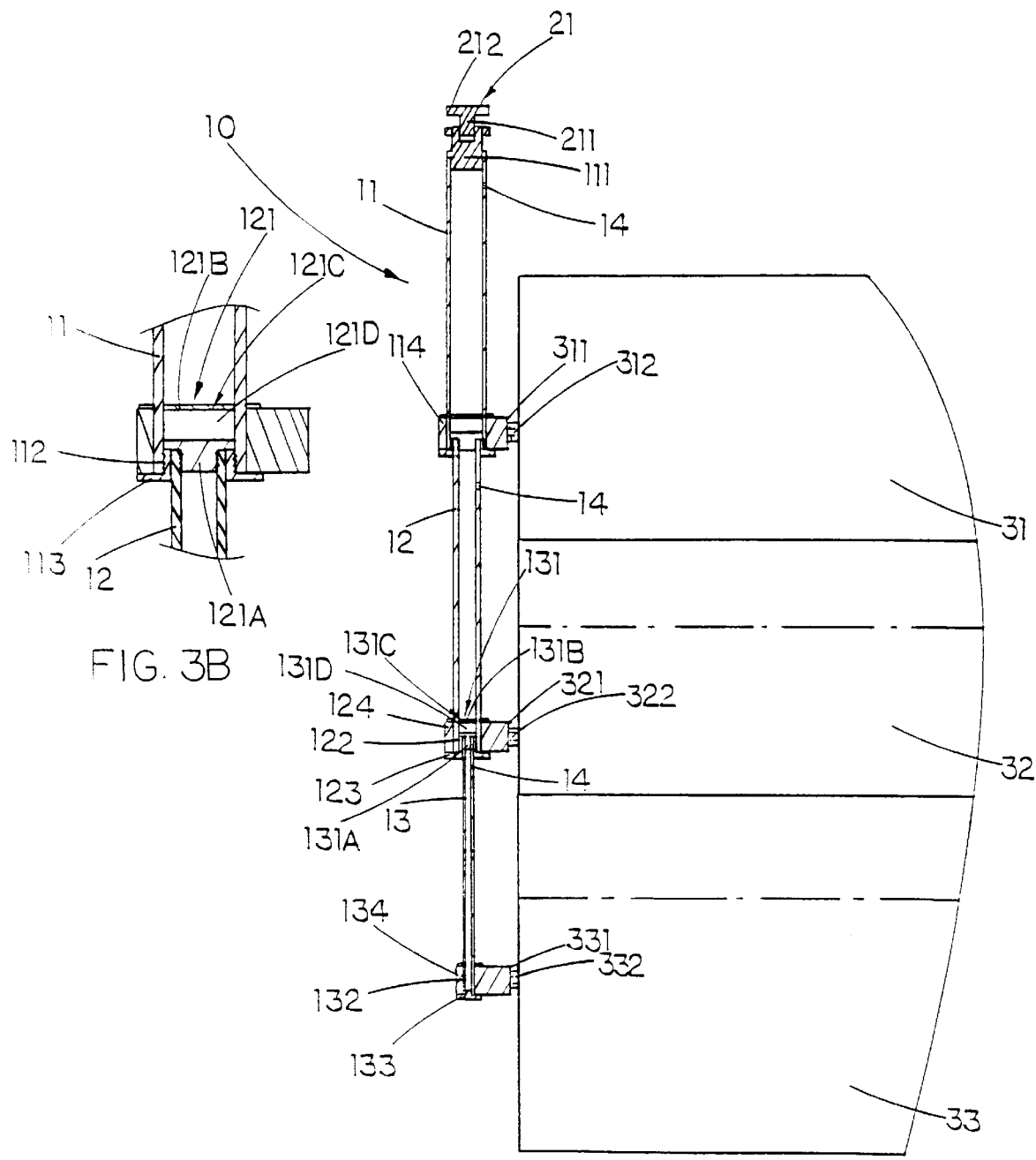
FIG. 3A is a partial sectional view of the extensible sunshine shelter apparatus according to the above preferred embodiment of the present invention.
FIG. 3B is a partially enlarged sectional view of the holding member according to the above preferred embodiment of the present invention.

As shown in FIGS. 2, 3A and 3B, each of the extensible devices 10 comprises a predetermined number of hollow extension tubes 11, 12, 13. In accordance with the present preferred embodiment, there are totally three extension tubes 11, 12, 13. In fact, the number of the extension tubes for the pair of extensible devices 10 can be two, four, five, or six, depending on the size of the window area of the passenger transportation and the desire of users. The first extension tube 11 has an inner diameter larger than an outer diameter of the second extension tube 12 adapted for slidably inserting into the first extension tube 11. The second extension tube has an inner diameter larger than an outer diameter of the third extension tube 13 adapted for slidably inserting into the second extension tube 12.

A top end of each first extension tube 11 is firmly connected with, for example by screwing, a supporting head 111 which is hinged on the mounting device 20. A bottom end of each first extension tube 11 is firmly connected with, for example by screwing, a ring shaped first stopper 112 which has an outer diameter fitted with the inner diameter of the first extension tube 11, an inner diameter equal to the outer diameter of the second extension tube 12, and a first enlarged base ring 113 having an outer diameter larger than the outer diameter of the first extension tube 11. The first extension tube 11 further comprises a first holding member 114 firmly attached to a bottom end portion of the first extension tube 11.

A top end of each second extension tube 12 is firmly connected with, for example by screwing, a first stopping head 121 having a shank 121a inserted into the top end of the second extension tube 12 and an enlarged stub 121b having an outer diameter equal to the inner diameter of the first extension tube 11. The enlarged stub 121b has a ring groove 121c for integrally retaining a frictional ring 121d which has an outer diameter slightly larger than the inner diameter of the first extension tube 11. A bottom end of each second extension tube 12 is firmly connected with, for example by screwing, a ring shaped second stopper 122 which has an outer diameter fitted with the inner diameter of the second extension tube 12, an inner diameter equal to the outer diameter of the third extension tube 13, and a second enlarged base ring 123 having an outer diameter larger than the outer diameter of the second extension tube 12. The second extension tube 12 further comprises a second holding member 124 firmly attached to a bottom end portion of the second extension tube 12.

A top end of each third extension tube 13 is firmly connected with, for example by screwing, a second stopping head 131 having a shank 131a inserted into the top end of the third extension tube 13 and an enlarged stub 131b having an outer diameter equal to the inner diameter of the second extension tube 12. The enlarged stub 131b has a ring groove 131c for integrally retaining a frictional ring 131d which has an outer diameter slightly larger than the inner diameter of the second extension tube 12. A bottom end of each third extension tube 13 firmly connected with, for example by screwing, a ring shaped third stopper 132 which has an outer diameter fitted with the inner diameter of the third extension tube 13 and an enlarged base ring 133 having an outer diameter larger than the outer diameter of the third extension tube 13. The third extension tube 13 further comprises a third holding member 134 firmly attached to a bottom end portion of the third extension tube 13.

Accordingly, the connection between the first and second extension tubes 11, 12 or the second and third extension tubes 12, 13 can be processed by firstly screwing the first stopping head 121 or the second stopping head 131 into the top end of the second extension tube 12 or the top end of the third extension tube 13 respectively; secondly inserting the top end portion of the second extension tube 12 or the top end portion of the third extension tube 13 into the bottom end of the first extension tube 11 or the bottom end of the second extension tube 12 respectively; and then finally screwing the first stopper 112 or the second stopper 121 to the bottom end of the first extension tube 11 or the bottom end of the second extension tube 12 respectively. Therefore, the second extension tube 12 or the third extension tube 13 can be forced to draw back into the first extension tube 11 or the second extension tube 12 respectively to reduce the overall length of the extensible device 10 or be forced to stretch out from the first extension tube 11 or the second extension tube 12 to elongate the length of the extensible device 10 until the first stopping head 121 or the second stopping head 131 is blocked by the first stopper 112 or the second stopper 122 respectively. Due to the friction existed between the inner surface of the first and second extension tubes 11, 12 and the frictional rings 121d or 131d respectively, the user must apply a pulling or pushing force larger than the frictional force in order to stretch out or draw back the second or third extension tube 12, 13. Certainly, on each extension tube 11, 12, 13, an air hole 14 is formed thereon to enable air in and out.

Figure 1:
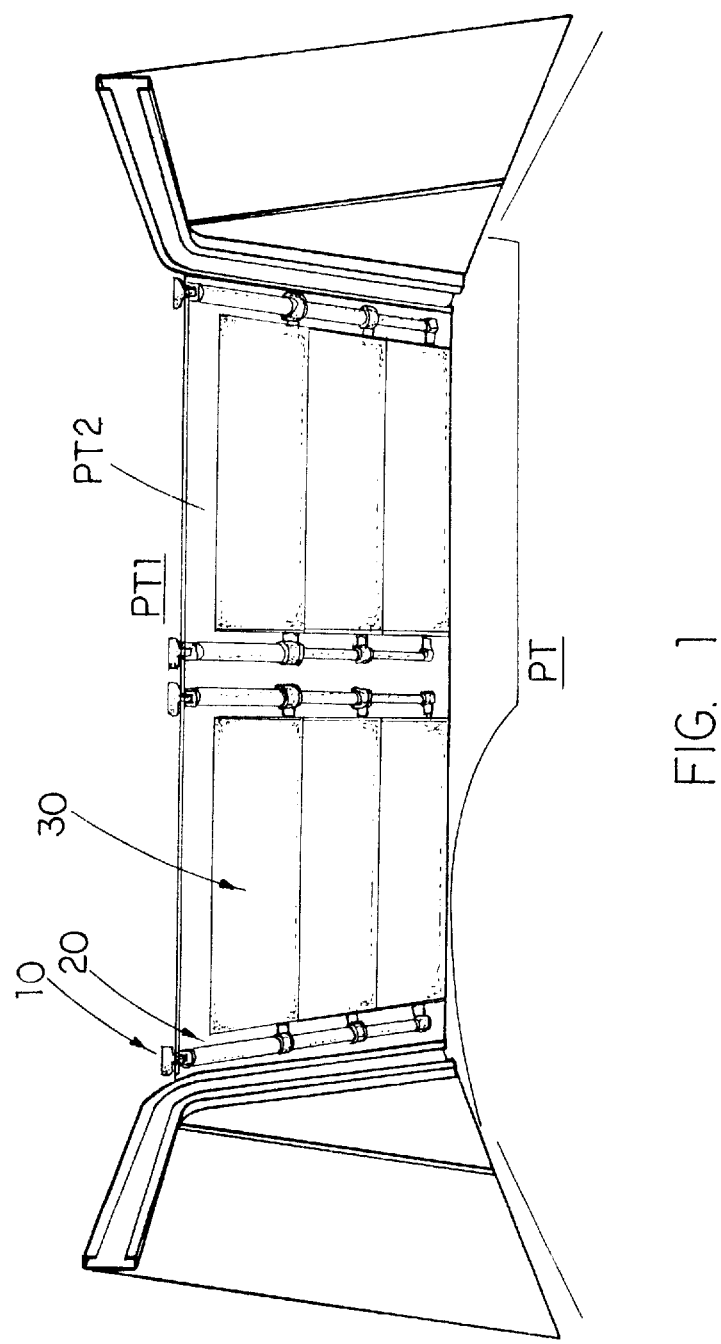
FIG. 1 is a perspective view of a front windshield of a vehicle, having installed with a pair of extensible sunshine shelter apparatus according to a preferred embodiment of the present invention.

As shown in FIGS. 2, 3A and 3B, the mounting device 20 comprises a pair of T-shape mounting heads 21, which are firmly affixed to an interior ceiling PT1 of a passenger transportation PT (as shown in FIG. 1), for hingedly jointing with the two supporting heads 111 so as to support the two extensible devices 10 in position respectively, wherein the two extensible devices 10 can be adjusted to parallel with a window area PT2 or the ceiling PT1 of the passenger transportation PT (as shown in FIGS. 4A to 4E). Each mounting head 21 has a vertical joint member 211 downwardly extended from a horizontal mounting member 212 which is adapted for screwing or adhering to an edge of the ceiling PT1, adjacent to the respective window area PT2, such as the front windshield or the side window, of the passenger transportation PT.

Each of the joint members 211 has a vertical rear side wall 214, a vertical front side wall 215, a trapezoid bottom end 213 which defines a narrowed horizontal edge 213a and two inclined side edges 213b and 213c. A through hole 216 is formed on the joint member 211 at a predetermined height. Each of the supporting heads 111 has two parallel joint wings 111a, 111b extended upwardly to define a receiving gap 111c therebetween. Each of the two joint wings 111a, 111b has a vertical elongated hole 111d, 111e thereon. The width of the receiving gap 111c is slightly smaller than the thickness of the joint member 211, so that the joint member 211 can be inserted into the receiving gap 111c and be pressed between the two joint wings 111a, 111b until the horizontal edge 213a is propped against a bottom surface 111f of the receiving gap 111c. A bolt 22 is penetrated through the through hole 216 and the two elongated holes 111d and 111e. By screwing a nut 23 to the threaded end of the bolt 22, the supporting head 111 is firmly connected with the mounting head 21.

Figures 4A, 4B:
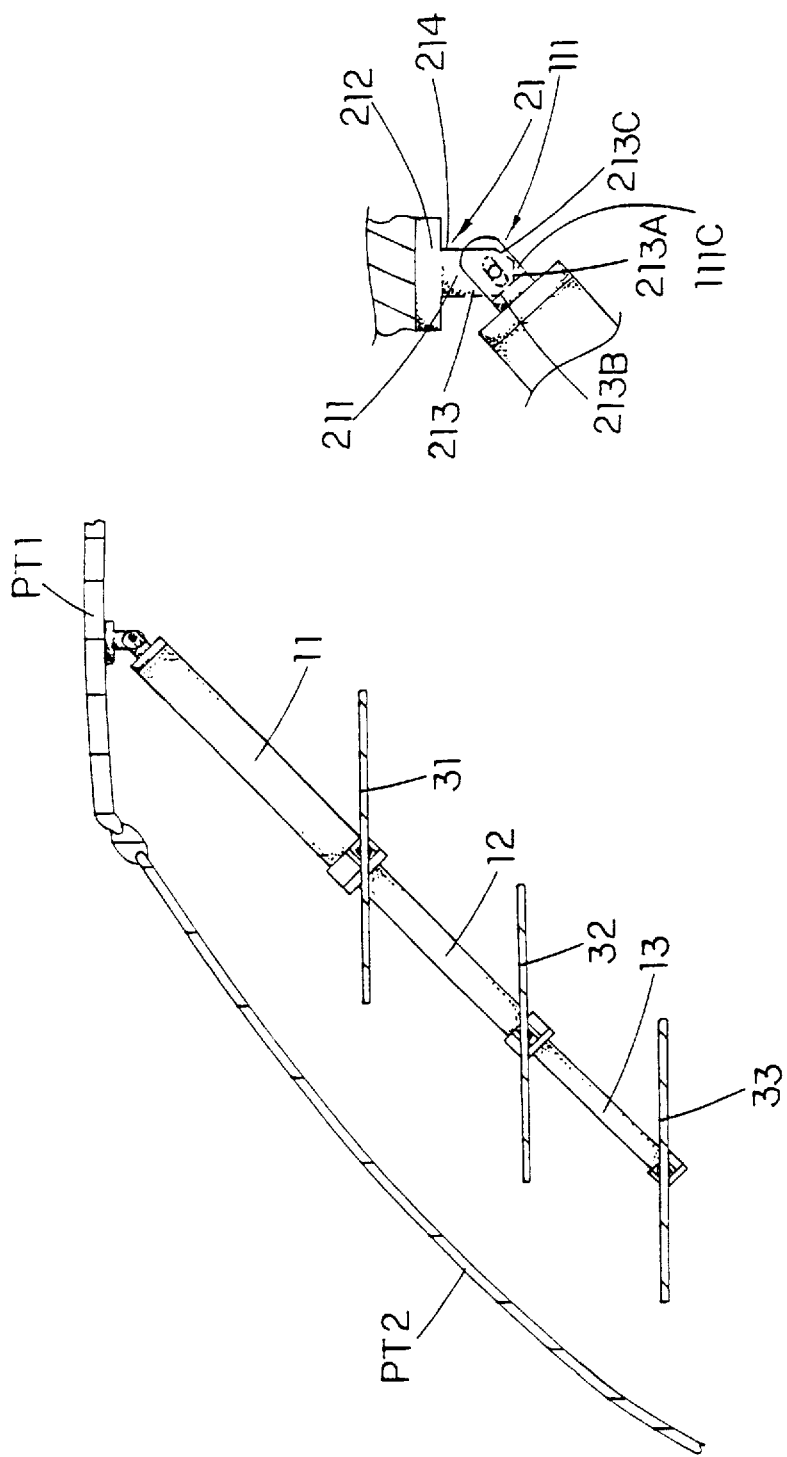

Basically, the two extensible devices 10 are parallelly hanged from the ceiling PT1 of the passenger transportation PT by means of the two mounting heads 21 of the mounting device 20. The blinding device 30 comprises a predetermined number of thin and light slats 31, 32, 33. Each slat 31, 32, 33 has two cylindrical plugs 311, 321, 331 coaxially protruded from the two ends thereof. Each cylindrical plug 311, 321, 331 provides a plurality of longitudinal tiny teeth 312, 322, 332 thereon. Each holding member 114, 124, 134 has a circular receiving socket 115, 125, 135 having a diameter equal to the respective plug 311, 321, 331 and a plurality of longitudinal tiny engaging teeth 15 provided thereon. Accordingly, each slats 31, 32, 33 can be rotatably mounted between the three pairs of holding members 114, 124, 134 respectively by inserting the two plugs 311, 321, 331 of each slat 31, 32, 33 into the two receiving sockets 115, 125, 135 of each pair of holding members 114, 124, 134. The frictional engagement configuration between the teeth 312, 322, 332 of each plug 311, 321, 331 and the engaging teeth 15 of each receiving socket 115, 125, 135 enables the slat 31, 32, 33 to be firmly held in position unless a rotating force is applied to the slat 31, 32, 33 to overcome the engagement friction between the teeth 312, 322, 332 and the engaging teeth 15. In other words, the slats 31, 32, 33 are adjustable to any desire inclined angle, such as positioning at horizontal position to enable the passenger to view through (as shown in FIG. 4A) or positioning at vertical position to block the sunshine (as shown in FIG. 4C).

As shown in FIG. 2, the extensible device 10 further comprises three folding device 16, 17, 18 attached on each of the slats 31, 32, 33 respectively. Each of the folding device 16, 17, 18 has a connecting groove 161, 171, 181 for connecting to the slats 31, 32, 33 and a shading plate 162, 172, 182 hingedly connected to each of the connecting groove 161, 171, 182 respectively.

Figure 4C:
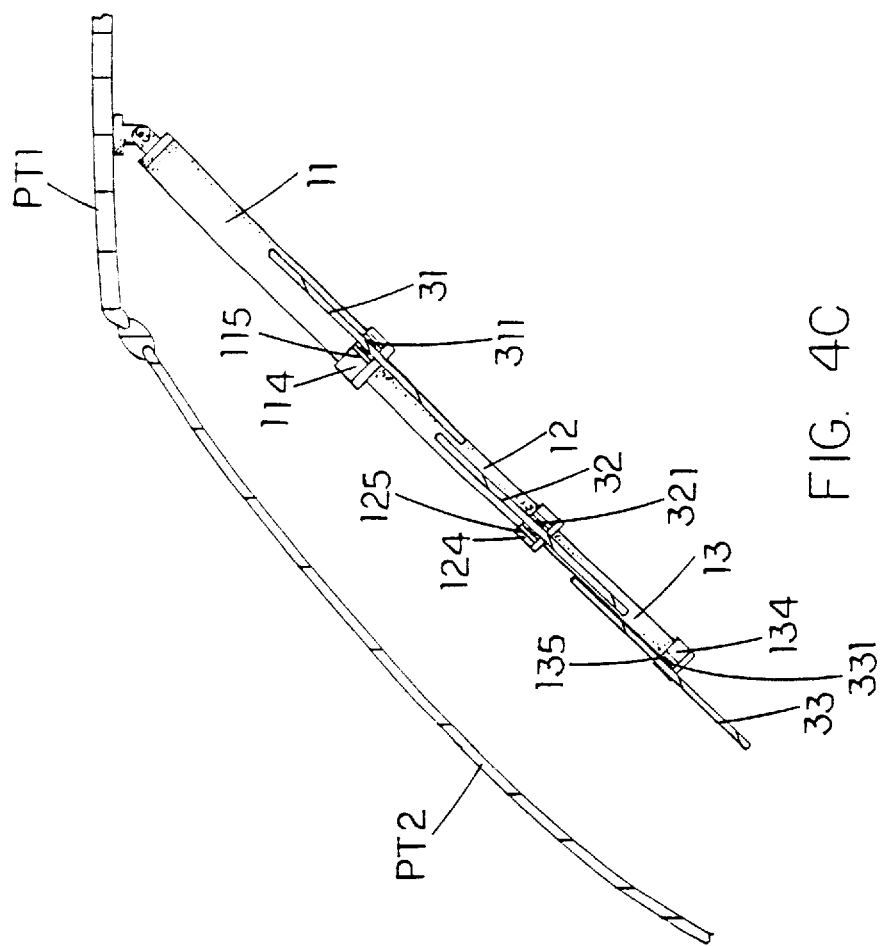

As shown in FIGS. 4A to 4E, it is worth to mentioned that the first, second and third receiving sockets 115, 125, 135 are positioned in a lower, a middle and an upper position respectively, so that the first, second and third slats 31, 32, 33 are mounted on different planes. Therefore, when the three pair of extension tubes 11, 12, 13 are contracted together, as shown in FIG. 4C, the three slats 31, 32, 33 can be overlapped together.

As shown in FIGS. 4D and 4E, when the extensible sunshine shelter apparatus of the present invention is not used, the user may contract the extensible sunshine shelter apparatus to the minimum length by inserting the pair of second extension tubes 12 into the pair of first extension tubes 11 and inserting the pair of third extension tubes 13 into the pair of second extension tubes 12. Therefore, the overall length of the extensible sunshine shelter apparatus is just approximately equal to the length of the first extension tube 11. Besides, all the slats 31, 32, 33 can be turned in parallel with the extension tubes 11, 12, 13 so as to reduce the overall thickness of the extensible sunshine shelter apparatus to equal to the diameter of the first extension tube 11. The pair of extensible devices 10 and the three slats 31, 32, 33 can be folded upwardly to the ceiling PT1 of the passenger transportation by rotating the supporting heads 111 upwards until the bottom surfaces 111f of the receiving gaps 111c thereof are propped against the vertical rear side walls 214 of the two joint members 211 of the two mounting heads 21 respectively.

When the extensible sunshine shelter apparatus is used, the user may simply swing the pair of extensible devices 10 and the three slats 31, 32, 33 downwards until the bottom surfaces 111f of the receiving gaps 111c of the pair of supporting heads 111 are propped against the inclined side edges 231b of the two joint members 211 of the pair of mounting heads 21 respectively, so that the extensible sunshine shelter apparatus is parallel with the window area PT2 just as the operation of the conventional shelter wings. As shown in FIGS. 4A and 4B, the improvement of the present invention over the conventional shelter wings is that the user may further stretch out the second and third extension tubes 12, 13 to enlarge the sheltering area. During parking, the user may turn all the slats 31, 32, 33 parallel to the window area PT2 to entirely block the sunshine, as shown in FIG. 4B. Besides, the user may also adjust the inclined angle of each slat 31, 32, 33 to shelter the direct sunshine and to enable the passenger to view outside. As shown in FIG. 4A, all the slats 31, 32, 33 are positioned horizontally and parallelly that the surrounding in front of the window area PT2 is visible to the passenger through the intervals between those thin slats 31, 32, 33. In the meanwhile, portion of the sunshine is shaded by the slats 31, 32, 33 from shining upon the passenger's face.

Figure 5A:
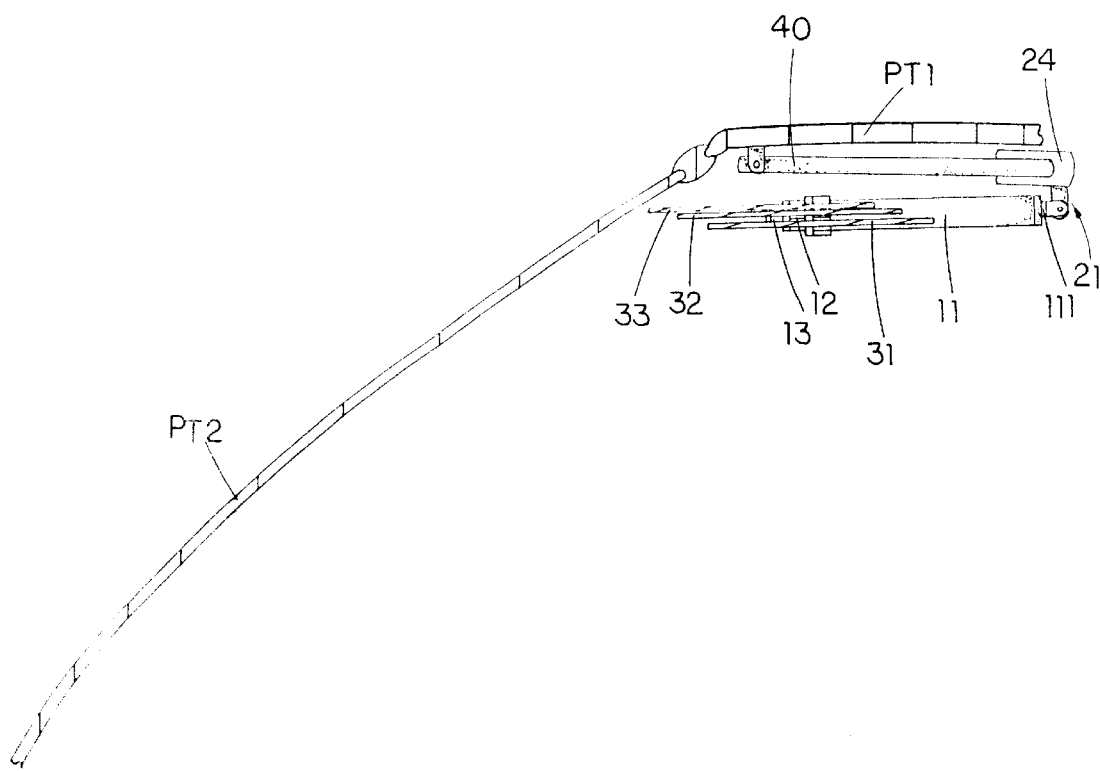
FIGS. 5A and 5B are two end views illustrating an alternative mode of the extensible sunshine shelter apparatus according to the above preferred embodiment of the present invention.
Figure 5B:
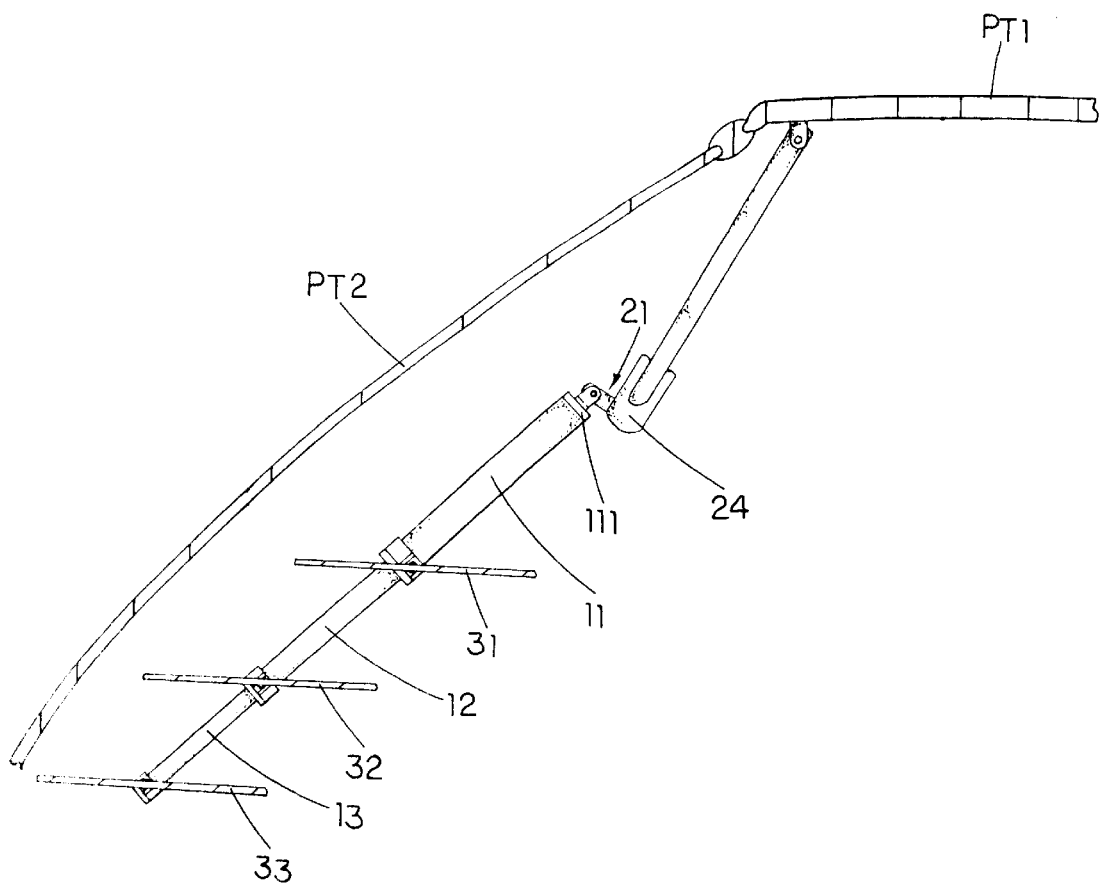

FIGS. 5A and 5B illustrates an alternative mode of the extensible sunshine shelter apparatus of the present invention, in which the mounting member 212 of each mounting head 21 is mounted on the end edge of a conventional shelter wing 40 by means of an adapter 24, in which the shelter wing 40 is foldably installed at the edge of the window area PT2 such as the front windshield. When the extensible sunshine shelter apparatus is not used, it can be contracted to reduce it size and folded upwardly to overlap with the shelter wing 40 to provide as much room as possible above the driver or passenger's head, as shown in FIG. 5A. When the extensible sunshine shelter apparatus is used, the user may swing the shelter wing 40 as well as the two extensible devices 10 and the slats 31, 32, 33 down towards the front windshield PT2, as shown in FIG. 5B.

FIG. 6 illustrates the situation of having a pair of extensible sunshine shelter apparatus of the present invention mounted to the two shelter wings 40 of the front windshield PT2, in which the rear view mirror 50 is attached to the front windshield PT2 by means of an universal ball joint 51, so that the two shelter wings 40 can be extended to in touch with each other for avoiding any sunshine penetrating between the two shelter wings 40. When the two shelter wings 40 are swung down, the user may adjust the position of the rear view mirror 50 through the ball joint 51 to dodge the shelter wings 40.

The extensible sunshine shelter apparatus of the present invention not only is adapted to installed at the front windshield or the rear windshield of an automobile as disclosed above, but also is capable of installing at the side window PT3 of the automobile, as shown in FIGS. 7A and 7D. FIGS. 7A and 7B illustrate the situation of the extensible sunshine shelter apparatus of the present invention which is folded upwardly to the ceiling PT1 when it is not used. Due to the fact that the side window PT3 is almost perpendicular to the ceiling PT1, as shown in FIGS. 7C and 7D, when the extensible sunshine shelter apparatus is in use, the two extensible devices 10 is folded downwards until the bottom surfaces 111f of the receiving gaps 111c of the pair of supporting heads 111 are propped against the horizontal edges 213a of the two joint member 211 of the pair of the mounting heads 21 respectively.

Accordingly, the extensible sunshine shelter apparatus of the present invention can be installed at any window area, such as the front windshield, the rear windshield or the side window, of any passenger transportation, such as car, bus, train, airplane, ship, and etc. We can also installed a plurality of extensible sunshine shelter apparatus to every window area of a vehicle for shading the sunshine from shining upon the faces and hands of driver and passengers without obstructing their vision. Moreover, the shading angle of each slat can be adjusted according to the direction and angle of the sunshine.

Besides, the extensible sunshine shelter apparatus not only can also be adjusted to shelter the entire window area from sunshine while parking or desired by the passengers can be adjusted to shelter only a top portion of the window area.

What is claimed is:

1. An extensible sunshine shelter apparatus for a window area of a passenger transportation, comprising a pair of extensible devices, in which each of said extensible devices comprises a first extension tube and at least a second extension tube coaxially connected end to end together, said first extension tube having an inner diameter larger than an outer diameter of said second extension tube, so that said pair of second extension tubes are capable of slidably inserting into said pair of first extension tubes respectively, a top end of each said first extension tube being firmly connected with a supporting head, a bottom end of each said first extension tube providing a first stopper to prevent said second extension tube from entirely stretching out from said first extension tube, each said first extension tube having a first air hole thereon and further comprising a first holding member which is firmly attached to a bottom end portion of each said first extension tube, a top end of each said second extension tube being firmly connected with a first stopping head which has an enlarged stub having an outer diameter at least equal to said inner diameter of said first extension tube so as to provide friction between an inner surface of said respective first extension tube and said enlarged stub, a bottom end of each said second extension tube providing a second stopper to prevent each said second extension tube from entirely inserting into said respective first extension tube, each said second extension tube having a second air hole thereon and further comprising a second holding member firmly attached to a bottom end portion of said second extension tube;

a mounting device, which is hingedly jointed with said pair of supporting heads of said pair of first extension tubes, for spacedly mounting said pair of extensible devices in parallel manner to an upper position, adjacent to said window area, of said passenger transportation; and a blinding device comprising at least two thin and light slats, in which said two slats are rotatably mounted between said two pairs of holding members which are attached to said bottom end portions of said pair of first extension tubes and said pair of second extension tubes respectively, wherein said slats are mounted on different planes, so that when said second pair of extension tubes are contracted within said pair of first extension tubes, said slats are overlapped together.

2. An extensible sunshine shelter apparatus for a window area of a passenger transportation, as recited in claim 1, in which said mounting device comprises a pair of mounting heads firmly affixed to said upper position of said passenger transportation, wherein each said mounting head has a vertical joint member extended downwardly, each of said joint members having a vertical rear side wall, a vertical front side wall, a trapezoid bottom end which defines a narrowed horizontal edge and two inclined side edges, a through hole being formed on each said joint member at a predetermined height, wherein each of said supporting heads has two parallel joint wings extended upwardly to define a receiving gap therebetween, each said joint wing having a vertical elongated hole thereon, a width of said receiving gap being slightly smaller than a thickness of said joint member, so that each said joint member is capable of inserting into each said receiving gap and being pressed between said two wings until said horizontal edge is propped against a bottom surface of said receiving gap, each said mounting head further comprising a bolt penetrated through said through hole and said two elongated holes of said two joint wings, and a nut connected to an threaded end of said bolt, so as to firmly connected said pair of supporting heads with said pair of mounting heads respectively.

3. An extensible sunshine shelter apparatus for a window area of a passenger transportation, as recited in claim 1, in which each said slat has two cylindrical plugs coaxially protruded from two ends of said slat, and that each said holding member has a circular receiving socket having a diameter equal to said respective plug, so that each said slat is rotatably mounted between each said pair of holding members by inserting said two plugs of each said slat into said two receiving sockets of each said pair of holding members.

4. An extensible sunshine shelter apparatus for a window area of a passenger transportation, as recited in claim 3, in which each said plug provides a plurality of longitudinal tiny teeth thereon, each said receiving socket having a plurality of longitudinal tiny engaging teeth provided thereon for engaging with said teeth of said plug which is inserted into said receiving socket, so that each said slat is firmly held in position by means of an engagement friction defined between said teeth of each said plug and said engaging teeth of each said receiving socket unless a rotating force is applied to each said slat to overcome said engagement friction.

5. An extensible sunshine shelter apparatus for a window area of a passenger transportation, as recited in claim 2, in which each said slat has two cylindrical plugs coaxially protruded from two ends of said slat, and that each said holding member has a circular receiving socket having a diameter equal to said respective plug, so that each said slat is rotatably mounted between each said pair of holding members by inserting said two plugs of each said slat into said two receiving sockets of each said pair of holding members.

6. An extensible sunshine shelter apparatus for a window area of a passenger transportation, as recited in claim 5, in which each said plug provides a plurality of longitudinal tiny teeth thereon, each said receiving socket having a plurality of longitudinal tiny engaging teeth provided thereon for engaging with said teeth of said plug which is inserted into said receiving socket, so that each said slat is firmly held in position by means of an engagement friction defined between said teeth of each said plug and said engaging teeth of each said receiving socket unless a rotating force is applied to each said slat to overcome said engagement friction.

7. An extensible sunshine shelter apparatus for a window area of a passenger transportation, as recited in claim 1, in which said first and second stoppers are in ring shaped, wherein each said first stopper has an outer diameter fitted with said inner diameter of said corresponding first extension tube, an inner diameter equal to said outer diameter of said corresponding second extension tube, and a first enlarged base ring having an outer diameter larger than said outer diameter of said corresponding first extension tube for retaining said corresponding first holding member, and that each said second stopper has an outer diameter fitted with said inner diameter of said corresponding second extension tube and an enlarged base ring having an outer diameter larger than said outer diameter of said corresponding second extension tube for retaining said corresponding second holding member, and that each said first stopping head has a shank inserted into said top end of said corresponding second extension tube and an enlarged stub having an outer diameter equal to said inner diameter of said corresponding first extension tube.

8. An extensible sunshine shelter apparatus for a window area of a passenger transportation, as recited in claim 2, in which said first and second stoppers are in ring shaped, wherein each said first stopper has an outer diameter fitted with said inner diameter of said corresponding first extension tube, an inner diameter equal to said outer diameter of said corresponding second extension tube, and a first enlarged base ring having an outer diameter larger than said outer diameter of said corresponding first extension tube for retaining said corresponding first holding member, and that each said second stopper has an outer diameter fitted with said inner diameter of said corresponding second extension tube and an enlarged base ring having an outer diameter larger than said outer diameter of said corresponding second extension tube for retaining said corresponding second holding member, and that each said first stopping head has a shank inserted into said top end of said corresponding second extension tube and an enlarged stub having an outer diameter equal to said inner diameter of said corresponding first extension tube.

9. An extensible sunshine shelter apparatus for a window area of a passenger transportation, as recited in claim 4, in which said first and second stoppers are in ring shaped, wherein each said first stopper has an outer diameter fitted with said inner diameter of said corresponding first extension tube, an inner diameter equal to said outer diameter of said corresponding second extension tube, and a first enlarged base ring having an outer diameter larger than said outer diameter of said corresponding first extension tube for retaining said corresponding first holding member, and that each said second stopper has an outer diameter fitted with said inner diameter of said corresponding second extension tube and an enlarged base ring having an outer diameter larger than said outer diameter of said corresponding second extension tube for retaining said corresponding second holding member, and that each said first stopping head has a shank inserted into said top end of said corresponding second extension tube and an enlarged stub having an outer diameter equal to said inner diameter of said corresponding first extension tube.

10. An extensible sunshine shelter apparatus for a window area of a passenger transportation, as recited in claim 6, in which said first and second stoppers are in ring shaped, wherein each said first stopper has an outer diameter fitted with said inner diameter of said corresponding first extension tube, an inner diameter equal to said outer diameter of said corresponding second extension tube, and a first enlarged base ring having an outer diameter larger than said outer diameter of said corresponding first extension tube for retaining said corresponding first holding member, and that each said second stopper has an outer diameter fitted with said inner diameter of said corresponding second extension tube and an enlarged base ring having an outer diameter larger than said outer diameter of said corresponding second extension tube for retaining said corresponding second holding member, and that each said first stopping head has a shank inserted into said top end of said corresponding second extension tube and an enlarged stub having an outer diameter equal to said inner diameter of said corresponding first extension tube.

11. An extensible sunshine shelter apparatus for a window area of a passenger transportation, as recited in claim 1, in which each said extensible device further comprises a third extension tube which has an outer diameter smaller than said second extension tube adapted for slidably inserting said second extension tube, a top end of each said third extension tube being firmly connected with a second stopping head which has an enlarged stub having an outer diameter at least equal to said inner diameter of said second extension tube so as to provide friction between an inner surface of said respective second extension tube and said enlarged stub of said second stopping head, a bottom end of each said third extension tube providing a third stopper to prevent each said third extension tube from entirely inserting into said respective first extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

12. An extensible sunshine shelter apparatus for a window area of a passenger transportation, as recited in claim 2, in which each said extensible device further comprises a third extension tube which has an outer diameter smaller than said second extension tube adapted for slidably inserting said second extension tube, a top end of each said third extension tube being firmly connected with a second stopping head which has an enlarged stub having an outer diameter at least equal to said inner diameter of said second extension tube so as to provide friction between an inner surface of said respective second extension tube and said enlarged stub of said second stopping head, a bottom end of each said third extension tube providing a third stopper to prevent each said third extension tube from entirely inserting into said respective first extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

13. An extensible sunshine shelter apparatus for a window area of a passenger transportation, as recited in claim 4, in which each said extensible device further comprises a third extension tube which has an outer diameter smaller than said second extension tube adapted for slidably inserting said second extension tube, a top end of each said third extension tube being firmly connected with a second stopping head which has an enlarged stub having an outer diameter at least equal to said inner diameter of said second extension tube so as to provide friction between an inner surface of said respective second extension tube and said enlarged stub of said second stopping head, a bottom end of each said third extension tube providing a third stopper to prevent each said third extension tube from entirely inserting into said respective first extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

14. An extensible sunshine shelter apparatus for a window area of a passenger transportation, as recited in claim 6, in which each said extensible device further comprises a third extension tube which has an outer diameter smaller than said second extension tube adapted for slidably inserting said second extension tube, a top end of each said third extension tube being firmly connected with a second stopping head which has an enlarged stub having an outer diameter at least equal to said inner diameter of said second extension tube so as to provide friction between an inner surface of said respective second extension tube and said enlarged stub of said second stopping head, a bottom end of each said third extension tube providing a third stopper to prevent each said third extension tube from entirely inserting into said respective first extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

15. An extensible sunshine shelter apparatus for a window area of a passenger transportation, as recited in claim 7, in which each said extensible device further comprises a third extension tube which has an outer diameter smaller than said second extension tube adapted for slidably inserting said second extension tube, a top end of each said third extension tube being firmly connected with a second stopping head which has a shank inserted into said top end of said third extension tube and an enlarged stub having an outer diameter at least equal to said inner diameter of said second extension tube so as to provide friction between an inner surface of said respective second extension tube and said enlarged stub of said second stopping head, a bottom end of each said third extension tube providing a third ring shaped stopper which has an outer diameter fitted with said inner diameter of said corresponding second extension tube and an enlarged base ring having an outer diameter larger than said outer diameter of said third extension tube, so as to prevent each said third extension tube from entirely inserting into said respective first extension tube, and that said ring shaped second stopper further has an inner diameter equal to said outer diameter of said third extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

16. An extensible sunshine shelter apparatus for a window area of a passenger transportation, as recited in claim 8, in which each said extensible device further comprises a third extension tube which has an outer diameter smaller than said second extension tube adapted for slidably inserting said second extension tube, a top end of each said third extension tube being firmly connected with a second stopping head which has a shank inserted into said top end of said third extension tube and an enlarged stub having an outer diameter at least equal to said inner diameter of said second extension tube so as to provide friction between an inner surface of said respective second extension tube and said enlarged stub of said second stopping head, a bottom end of each said third extension tube providing a third ring shaped stopper which has an outer diameter fitted with said inner diameter of said corresponding second extension tube and an enlarged base ring having an outer diameter larger than said outer diameter of said third extension tube, so as to prevent each said third extension tube from entirely inserting into said respective first extension tube, and that said ring shaped second stopper further has an inner diameter equal to said outer diameter of said third extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

17. An extensible sunshine shelter apparatus for a window area of a passenger transportation, as recited in claim 9, in which each said extensible device further comprises a third extension tube which has an outer diameter smaller than said second extension tube adapted for slidably inserting said second extension tube, a top end of each said third extension tube being firmly connected with a second stopping head which has a shank inserted into said top end of said third extension tube and an enlarged stub having an outer diameter at least equal to said inner diameter of said second extension tube so as to provide friction between an inner surface of said respective second extension tube and said enlarged stub of said second stopping head, a bottom end of each said third extension tube providing a third ring shaped stopper which has an outer diameter fitted with said inner diameter of said corresponding second extension tube and an enlarged base ring having an outer diameter larger than said outer diameter of said third extension tube, so as to prevent each said third extension tube from entirely inserting into said respective first extension tube, and that said ring shaped second stopper further has an inner diameter equal to said outer diameter of said third extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

18. An extensible sunshine shelter apparatus for a window area of a passenger transportation, as recited in claim 10, in which each said extensible device further comprises a third extension tube which has an outer diameter smaller than said second extension tube adapted for slidably inserting said second extension tube, a top end of each said third extension tube being firmly connected with a second stopping head which has a shank inserted into said top end of said third extension tube and an enlarged stub having an outer diameter at least equal to said inner diameter of said second extension tube so as to provide friction between an inner surface of said respective second extension tube and said enlarged stub of said second stopping head, a bottom end of each said third extension tube providing a third ring shaped stopper which has an outer diameter fitted with said inner diameter of said corresponding second extension tube and an enlarged base ring having an outer diameter larger than said outer diameter of said third extension tube, so as to prevent each said third extension tube from entirely inserting into said respective first extension tube, and that said ring shaped second stopper further has an inner diameter equal to said outer diameter of said third extension tube, wherein each said third extension tube is prevented from entirely stretching out form each said second extension tube by means of each said second stopper, each said third extension tube further comprising a third holding member firmly attached to a bottom end portion of each said third extension tube, and that said blinding device further comprises a third slat rotatably mounted between said pair of third holding member.

19. An extensible sunshine shelter apparatus for a window area of a passenger transportation, as recited in claim 1, in which each said mounting head is affixed to an interior ceiling of said passenger transportation.

20. An extensible sunshine shelter apparatus for a window area of a passenger transportation, as recited in claim 1, in which each said mounting head is mounted on an end edge of a shelter wing of a front windshield of said passenger transportation by means of an adapter.

21. An extensible sunshine shelter apparatus for a window area of a passenger transportation, as recited in claim 1, in which said extensible device further comprises three folding device attached on each of said slats respectively, in which each of said folding device has a connecting groove for connecting to said slats and a shading plate hingedly connected to each of said connecting groove respectively.

* * * * *